United States Patent
Sato et al.

(10) Patent No.: US 7,406,187 B2
(45) Date of Patent: Jul. 29, 2008

(54) METHOD AND SYSTEM FOR PROCESSING AN IMAGE

(75) Inventors: Makoto Sato, Setagaya-ku (JP); Muling Guo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 652 days.

(21) Appl. No.: 11/044,103

(22) Filed: Jan. 27, 2005

(65) Prior Publication Data

US 2005/0201607 A1    Sep. 15, 2005

(30) Foreign Application Priority Data

Feb. 23, 2004 (JP) ............................. 2004-046482

(51) Int. Cl.
*G06K 9/00* (2006.01)
(52) U.S. Cl. ...................... 382/128; 382/220; 378/21
(58) Field of Classification Search ................ 382/100, 382/106, 128–133, 107, 153–154, 168, 181, 382/194, 203, 209, 232, 254, 274, 276, 305, 382/287–296, 134, 189, 190, 216, 220, 221; 378/4, 20, 21, 114
See application file for complete search history.

(56) References Cited

U.S. PATENT DOCUMENTS

| | | | |
|---|---|---|---|
| 5,982,915 A * | 11/1999 | Doi et al. ..................... | 382/130 |
| 6,483,934 B2 * | 11/2002 | Armato et al. .............. | 382/132 |
| 6,594,378 B1 * | 7/2003 | Li et al. ..................... | 382/128 |
| 7,072,501 B2 * | 7/2006 | Wood et al. ................. | 382/132 |
| 7,123,762 B2 * | 10/2006 | Giger et al. ................. | 382/132 |
| 7,295,691 B2 * | 11/2007 | Uppaluri et al. ............. | 382/130 |

* cited by examiner

*Primary Examiner*—Seyed Azarian
(74) *Attorney, Agent, or Firm*—Canon U.S.A. Inc., I.P. Division

(57) ABSTRACT

In computer aided diagnosis, a high-accuracy image indicating a temporal difference of a diseased part of a patient is produced from a current image and a past image as follows. First, a plurality of matching ROIs (Regions of Interest) are defined on the current image and the past image. A matching processing is performed on corresponding ROIs of the two images to determine points on the past image corresponding to the respective points on the current image. Obtained shift vectors are fitted to a two-dimensional polynomial. In the fitting, when a matching ROI of the current image is included in or overlapped with a previously-defined region of interest, shift vectors are weighted by a small factor. The current image is then modified according to obtained fitting coefficients. Finally, an image indicating the difference between the modified current image and the past image is produced.

7 Claims, 5 Drawing Sheets

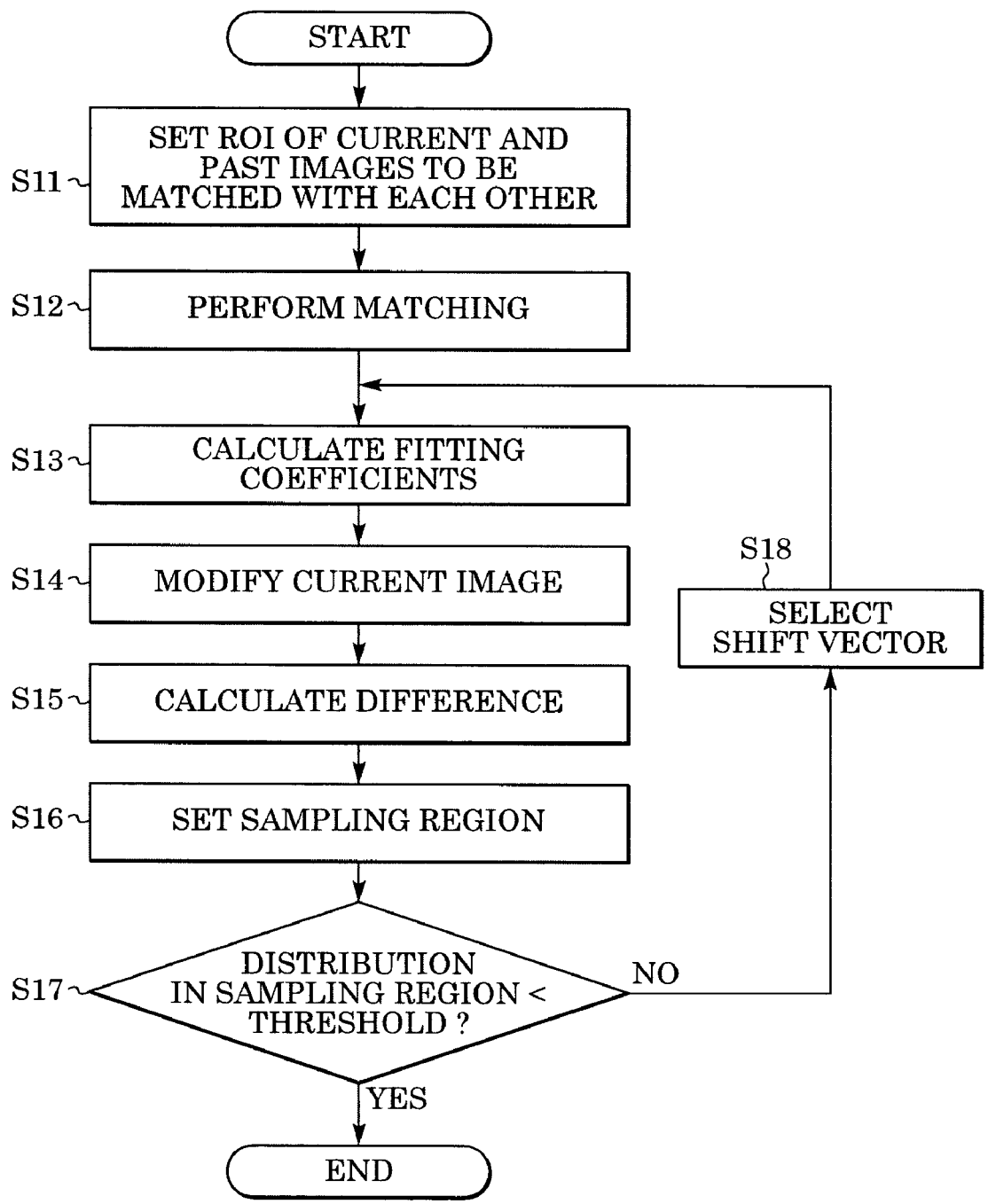

METHOD AND SYSTEM FOR PROCESSING AN IMAGE

BACKGROUND OF THE INVENTION

1. Field of the Invention

The present invention relates to an image processing method and an image processing system for extracting a temporal change in a subject based on images such as X-ray images of the subject.

2. Description of the Related Art

In the field of medical image technology, intensive research activities continue to occur on computer aided diagnosis (CAD). In CAD, a diseased part of a patient is detected by analyzing a diagnosis image such as an X-ray image or a CT (Computer Tomography) image using a computer. CAD is a promising technique for early disease detection.

A wide variety of CAD techniques have been proposed depending on what is detected and on what type of image is output. Of the wide variety of techniques, one promising technique is known as temporal difference CAD. In this technique, a difference between images of the same subject taken at different times is detected, and an image is produced based on the detected difference such that a part having a temporal difference is enhanced in the image.

More specifically, in the temporal difference CAD, for example, when a set of chest X-ray images (a current image and a past image) taken at different times is given, images are analyzed to detect the relative positional displacement between the images. The positional displacement of the current image or the past image is corrected such that the anatomical parts of the two images come to the same positions. Thereafter, the difference between the two images is detected on a pixel-by-pixel basis, and a difference image indicating the difference is produced. Because the temporal difference CAD technique provides a difference image that indicates only a temporal difference between images taken at different times without indicating the anatomically normal parts, the temporal difference CAD technique is very useful to monitor a change in a diseased part.

An example of a temporal difference CAD technique is disclosed in U.S. Pat. No. 5,982,915. FIG. 7 shows a process of determining a temporal difference in accordance with the technique disclosed in U.S. Pat. No. 5,982,915.

In the technique shown in FIG. 7, in step P1, a current image and past image captured prior to the current image each have a 2048×2048 resolution. The images are converted to images with lower resolutions of 512×512 and 128×128 by using a proper resolution conversion method. In step P2, the images with the 128×128 resolution are passed through a Gaussian filter to remove high-frequency components from the images thereby producing images with a reduced size representing their outline.

A global shift vector indicating a global positional replacement between two reduced images with the 128×128 resolution is then determined. In step P4, based on the positional relationship between the two images indicated by the global shift vector, regions of interest (ROIs) are set in each image with the 512×512 resolution, and local shift vectors are determined by comparing each pair of corresponding ROIs of the two images. Parameters that allow calculation of a shift vector at an arbitrary position are determined by means of interpolation using a two-dimensional polynomial, and the relative positional displacement between the two images is corrected by modifying the current image or the past image. Thereafter, the difference between the two images is detected and a difference image is produced based on the detected difference.

As described above, a high-accuracy positional correction is made by performing the two-stage correction process, that is, by first correcting the positional displacement due to a difference in position of a subject whose image is taken, and then correcting the global displacement using reduced images before performing the difference detection process.

In principle, the difference image indicates only the difference between two images. This means that when each image includes a diseased part, if there is no change in the diseased part between the two images, the difference image indicates nothing about the diseased part. This can cause wrong diagnosis unless information is provided to indicate that there is the diseased part.

If a diseased part has already been detected, when a difference image is produced to monitor a change in the diseased part, it is desirable that the difference image produced via the difference determination process precisely represents the details of the difference in the diseased part.

However, in the conventional technique, past diagnosis information of a patient is not used in the temporal difference determination process, which can cause a reduction in reliability of diagnosis. Thus, there is a need for a technique to avoid such a problem.

SUMMARY OF THE INVENTION

The present invention provides an image processing system and an image processing method of determining a temporal difference image without the associated disadvantages of the related art.

In an aspect, the present invention provides an image processing method of performing a temporal difference determination process based on at least diagnosis information associated with first image data or diagnosis information associated with second image data, comprising the steps of aligning the first image data and the second image data with each other, and determining a difference between the first image data and the second image data aligned with each other, wherein the aligning in the aligning step is performed using region information included in the diagnosis information.

In another aspect, the present invention provides a program for causing a computer to implement an image processing method of performing a temporal difference determination process based on at least diagnosis information associated with first image data or diagnosis information associated with second image data, the image processing method comprising the steps of aligning the first image data and the second image data with each other, and determining a difference between the first image data and the second image data aligned with each other, wherein the aligning in the aligning step is performed using region information included in the diagnosis information.

Yet, in another aspect, the present invention provides a computer-readable storage medium including a program stored therein for causing a computer to implement an image processing method of performing a temporal difference determination process based on at least diagnosis information associated with first image data or diagnosis information associated with second image data, the image processing method comprising the steps of aligning the first image data and the second image data with each other, and determining a difference between the first image data and the second image data data aligned with each other, wherein the aligning in the aligning step is performed using region information included in the diagnosis information.

In another aspect, the present invention provides an image processing system for performing a temporal difference determination process based on at least diagnosis information associated with first image data or diagnosis information associated with second image data, comprising alignment means for aligning the first image data and the second image data with each other, determination means for determining a difference between the first image data and the second image data aligned with each other, wherein the alignment means performs the alignment using region information included in the diagnosis information.

In a further aspect, an image processing system for performing a temporal difference determination process based on diagnosis information associated with first image data or diagnosis information associated with second image data is disclosed. The system includes an alignment unit for aligning the first image data and the second image data with each other. The system also includes a determination unit for determining a difference between the first image data and the second image data aligned with each other. It is noted that the alignment unit performs the alignment using region information included in the diagnosis information.

Further features and advantages of the present invention will become apparent from the following description of exemplary embodiments with reference to the attached drawings.

BRIEF DESCRIPTION OF THE DRAWINGS

FIG. 5 is a flow chart showing a difference determination process.

DETAILED DESCRIPTION OF THE EMBODIMENTS

Embodiments of the present invention will now be described in detail with reference to the accompanying drawings.

First Embodiment

Figure 1:
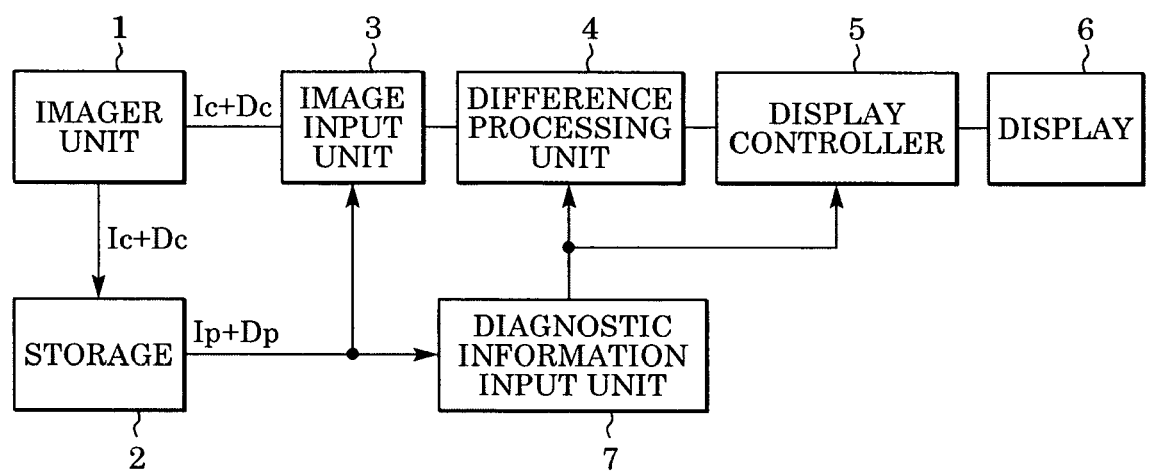
FIG. 1 is a circuit block diagram of an image processing system according to a first embodiment.

FIG. 1 is a circuit block diagram of an image processing system according to a first embodiment. The output of the imager unit 1 for capturing a medical image is connected to a storage unit 2 that includes a hard disk or a magnetooptical disk for storing images. The imager unit 1 is also connected to an image input unit 3. The output of the image input unit 3 is connected to a difference processing unit 4, whose output is connected to a display controller 5. The output of the display controller 5 is connected to a display 6 such as a CRT monitor or a liquid crystal display or a printer. The output of the storage unit 2 is connected to the image input unit 3 and a diagnostic information input unit 7. The output of the diagnostic information input unit 7 is connected to the difference processing unit 4 and the display controller 5.

The imager unit 1 produces an image used in diagnosis. For example, a modality such as an X-ray imager is used as the imager unit 1. Although an X-ray imager is used as the imager unit 1 in the present embodiment, the imager unit 1 usable in the present invention is not limited to the X-ray imager but other types of imagers may also be used.

A current image Ic produced by the imager unit 1 is output to the storage unit 2 and the image input unit 3. Note that the current image Ic need not be supplied directly from the imager unit 1 but may be supplied from an image server via a network. Data output from the imager unit 1 include not only the current image Ic but also information Dc associated with the current image such as the name of a patient, a ID number of the patient, the birthday of the patient, a remark, etc.

In addition to the current image captured by the imager unit 1, a past image Ip of the same patient captured prior to the current image and associated information Dp are also supplied to the image input unit 3 from the storage unit 2. In the present embodiment, it is assumed that the past image Ip previously captured for the same patient is already stored in the storage unit 2. The current image Ic and the associated information Dc need not be supplied from the imager unit 1 but may be supplied from the storage unit 2.

Figure 2:
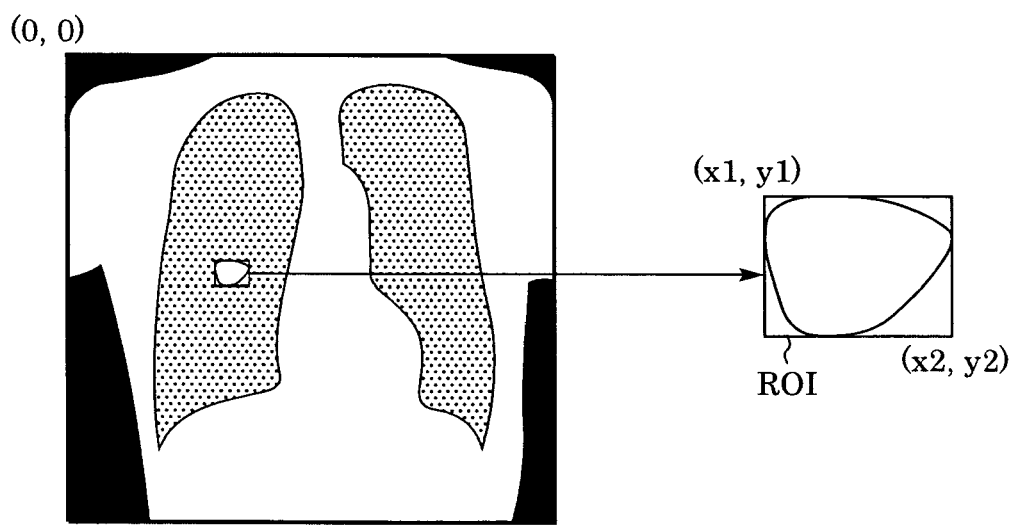
FIG. 2 is a diagram showing a region of interest in a captured image.

The information Dp associated with the past image Ip output from the storage unit 2 is also input to the diagnostic information input unit 7. In the present embodiment, if the associated information Dp includes a remark, it is determined that the associated information Dp includes a ROI (Region Of Interest). The ROI refers to a diseased region in the past image Ip, and the ROI is represented, for example, by coordinates x1, x2, y1, and y2 that define a rectangular region including a diseased part as shown in FIG. 2. The coordinates of the ROI are output from the diagnostic information input unit 7 to the difference processing unit 4.

Figure 7:
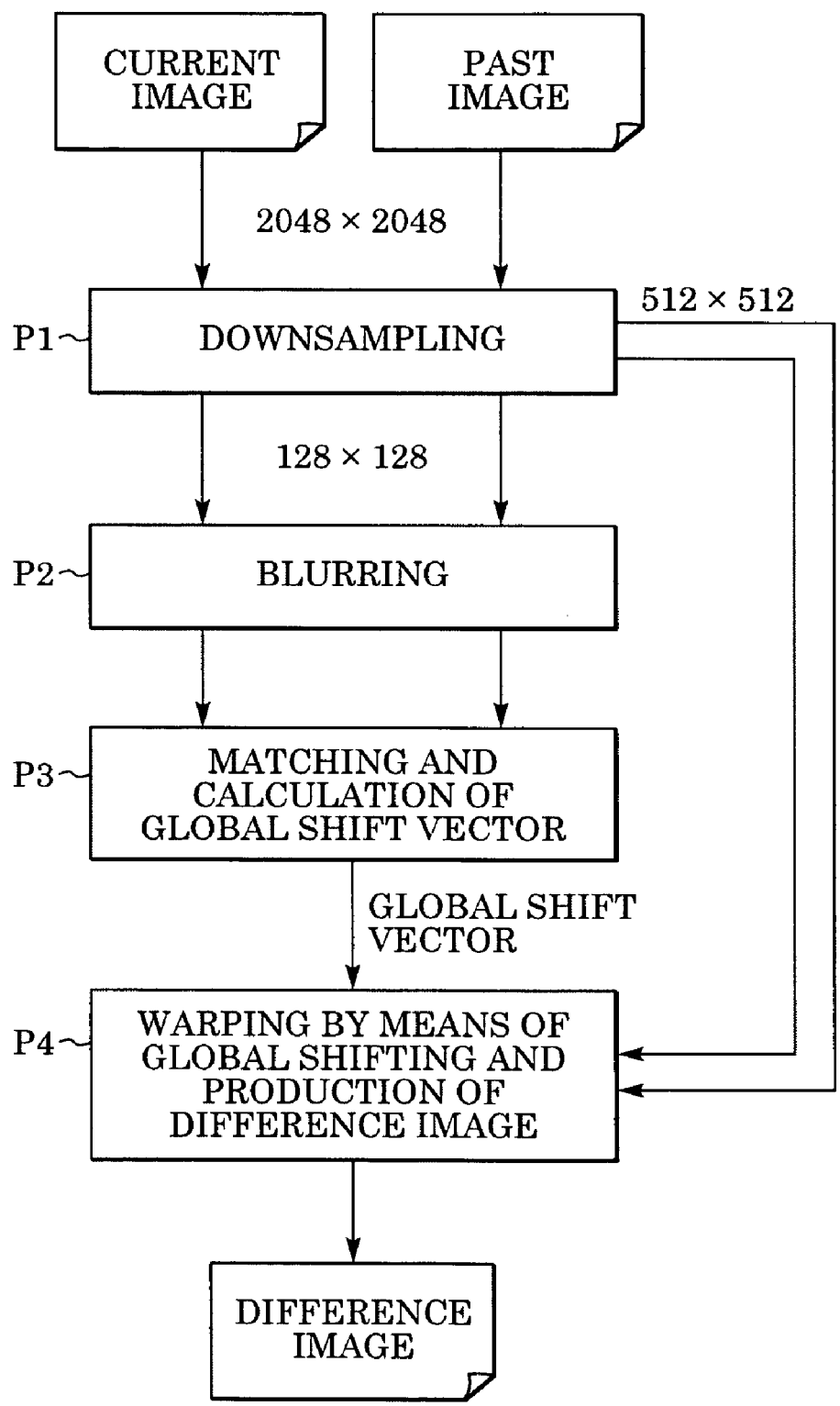
FIG. 7 is a flow chart showing a conventional difference determination process.

The image input unit 3 outputs the current image Ic and the past image Ip to the difference processing unit 4. As in the conventional technique, the difference processing unit 4 produces an image representing the difference between the two images via the process shown in FIG. 7. However, unlike the conventional technique, information associated with the ROI is used to determine the difference in step P4.

Figure 3:
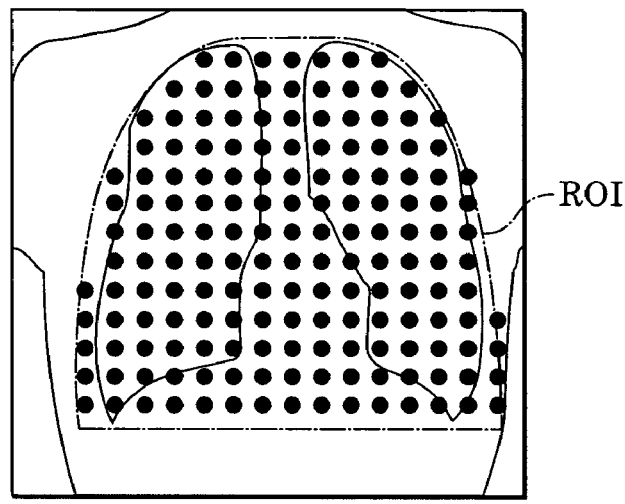
FIG. 3 is a diagram showing an example of an image in which a thorax is set as a region of interest.

FIG. 3 shows an example of a current image Ic in which a thorax is set as a ROI. In FIG. 3, dots denote representative points taken at regular intervals in the ROI.

Figure 4:
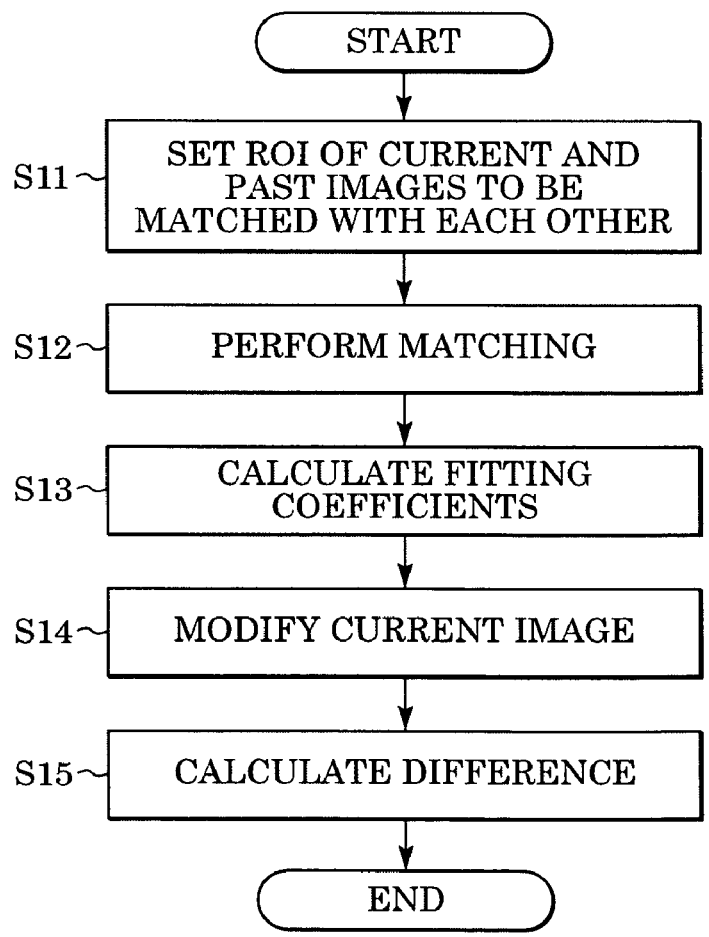
FIG. 4 is a flow chart showing a difference determination process.

FIG. 4 is a flow chart showing a basic part of the process of determining the difference between a past and a current image. In step S11, a matching ROI (hereinafter, also referred to as a ROImc) is defined for each representative point in the current image Ic. Each ROImc is defined such that it has a fixed size such as a 21×21 pixel size, and the center thereof is located at a representative point. Note that the matching ROIs (ROImc's) are defined after the global positional displacement between the two images is corrected based on the global shift vector determined in step P3 shown in FIG. 7 such that the ROI corresponding to the thorax is substantially coincident between the two images.

In step S12, a matching process is performed for each pair of corresponding ROImc to determine a point on the past image Ip corresponding to each representative point on the current image Ic. In the matching process, for example, a point having a highest correlation coefficient is determined using a known method.

More specifically, a region on the past image Ip having a highest coefficient of correlation with a square region whose center is located at each representative point is determined, and the center point of the determined regions is employed as the point corresponding to that representative point. Thus, a shift vector (Δxi, Δyi) is determined which represents the shift from a representative point (xi, yi) on the current image Ic to a corresponding point (xi', yi') on the past image Ip.

In step S13, 2-dimensional fitting to a two-dimensional polynomial is performed on the shift vectors (Δxi, Δyi) determined in step S12 for representative points and corresponding points. More specifically, coefficients Cn of the polynomial are determined such that Sx given by equation (1) has a minimum value, by using the least squares method. In the determination of the coefficients Cn using the least squares method, each shift vector is weighted by a weighing factor wi to adjust the contribution of the shift vector to the fitting.

$$Sx = \sum_{i=1}^{n} w_i(\Delta x_i - (c_i x_i^m y_i^m + \Lambda + c_{k-2} y_i + c_{k-1} x_i + 1))^2 \quad (1)$$

When a ROImc of the current image Ic is included in or overlapped with a ROI input to the difference processing unit 4 from the diagnostic information input unit 7, a small weighting factor is applied to a shift vector corresponding to that ROImc. For example, 0.5 is applied as the weighting factor to such a shift vector, and, for example, 1 is applied for the other shift vectors.

In step S14, the current image Ic is modified based on the fitting coefficients obtained in the previous step. More specifically, X coordinates (xi) of the current image Ic are shifted to X coordinates (xi') of the past image Ip.

$$x_i = c_1 x_i^m y_i^m + \ldots c_{k-2} y_i + c_{k-1} x_i + c_k \quad (2)$$

Similarly, a shift vector in the Y direction is determined for each point.

As described above, in the two-dimensional polynomial interpolation, when two-dimensional is given, the coefficients of the polynomial by which to approximate the two-dimensional data are determined from the input two-dimensional data using the least squares method or the like. In the two-dimensional polynomial interpolation, the coefficients are determined taking into account all points in the regions of interest, and thus smooth interpolation of two-dimensional data can be achieved, and noise included in the data is suppressed to a certain degree. This is the advantage obtained by employing the two-dimensional polynomial interpolation to interpolate the corresponding-point shift vectors.

In step S15, the difference of the current image Ic from the past image Ip is determined, and a resultant difference image is output to the display controller 5. The display controller 5 controls the display 6 such that the difference image, the current image Ic, the past image Ip, and their associated information are displayed at particular positions on the screen of the display 6.

In the present embodiment, as described above, when the fitting associated with the shift vectors is performed by the difference processing unit 4, shift vectors associated with ROIs excluded in or non-overlapped with some ROIs of the past diagnosis information received from the storage unit 2 are assigned a weighting factor, and the difference image is produced by modifying the current image based on the fitting result. Since the signal of normal anatomical structure is well reduced by aforementioned fitting manner, the difference is determined with greater enhancement for the region of interest determined in the past diagnosis.

In addition, the weighting factor may also be modified depending on the average value of pixel values. In chest X-ray images, the average luminance level is high and contrast is low in both a mediastinal space and an abdominal cavity, and thus high accuracy is not necessarily obtained in the matching process. In view of the above, a small weighting factor may be applied to shift vectors that are not included in the region of interest and that are associated with regions in which the luminance level is high.

When a shift vector is associated with a region in the mediastinal space or the abdominal cavity, if the shift vector is included in a region of interest, the small weighting factor is not applied thereto to prevent degradation in image quality in a part important for diagnosis.

Second Embodiment

In the first embodiment described above, weighting factors used in the determination of shift vectors by using matching are determined based on the region of interest defined in the past diagnosis information. Instead of adjusting the weighting factor, the matching process may be switched.

In a second embodiment described below, in view of the above, a plurality of matching methods are prepared for use in the matching process between the current image Ic and the past image Ip. More specifically, the matching process is performed every predetermined number of pixels, and the predetermined number is switched. When the cross-correlation coefficient is used as the matching measure, the cross-correlation coefficient C(a, b) at a point (a, b) is given by equation (3) shown below.

$$C(a, b) = \sum_{m=0}^{M-1} \sum_{n=0}^{N-1} \frac{\{I_{p(a,b)}(m, n) - \bar{I}_p\}\{I_c(m, n) - \bar{I}_c\}}{\sqrt{\sigma_p \sigma_c}} \quad (3)$$

$$\bar{I}_p = \frac{1}{MN} \sum_{m=0}^{M-1} \sum_{n=0}^{N-1} I_{p(a,b)}(m, n) \quad (4)$$

$$\bar{I}_c = \frac{1}{MN} \sum_{m=0}^{M-1} \sum_{n=0}^{N-1} I_c(m, n) \quad (5)$$

$$\sigma_p = \frac{1}{MN} \sum_{m=0}^{M-1} \sum_{n=0}^{N-1} \{I_{p(a,b)}(m, n) - \bar{I}_p\}^2 \quad (6)$$

$$\sigma_c = \frac{1}{MN} \sum_{m=0}^{M-1} \sum_{n=0}^{N-1} \{I_c(m, n) - \bar{I}_c\}^2 \quad (7)$$

where Ip(a, b) is image data of a matching region of interest (ROImp) defined at the point (a, b) on the past image Ip, and Ic is image data of a corresponding region on the current image Ic.

In the image matching technology, the current image Ic is called a template. In the first embodiment described above, the cross-correlation coefficient C(a, b) given by equation (3) is calculated while displacing the template by one pixel.

In contrast, in the second embodiment, when a point subjected to the matching process is excluded the region of interest defined in the diagnosis information received in the diagnostic information input unit 7, the cross-correlation coefficient C(a, b) given by equation (3) is calculated while displacing the template by one pixel. However, in the case in which the point is in the region of interest, the cross-correlation coefficient C(a, b) given by equation (3) is calculated while displacing the template by two or more pixels.

This results in an increase in the total processing speed while achieving high matching accuracy for other than the region of interest although a slight decrease occurs in the matching accuracy for regions of interest.

Third Embodiment

In the first and second embodiments described above, the process is adapted depending on the region of interest defined in the past diagnosis information. Alternatively, the process may be adapted based on other information.

FIG. 5 is a flow chart showing a difference determination process according to a third embodiment. Steps S11 to S15 are similar to those shown in FIG. 4. In step S16 and following steps, the image quality of a difference image produced via steps S11 to S15 is evaluated as follows.

Figure 6A:
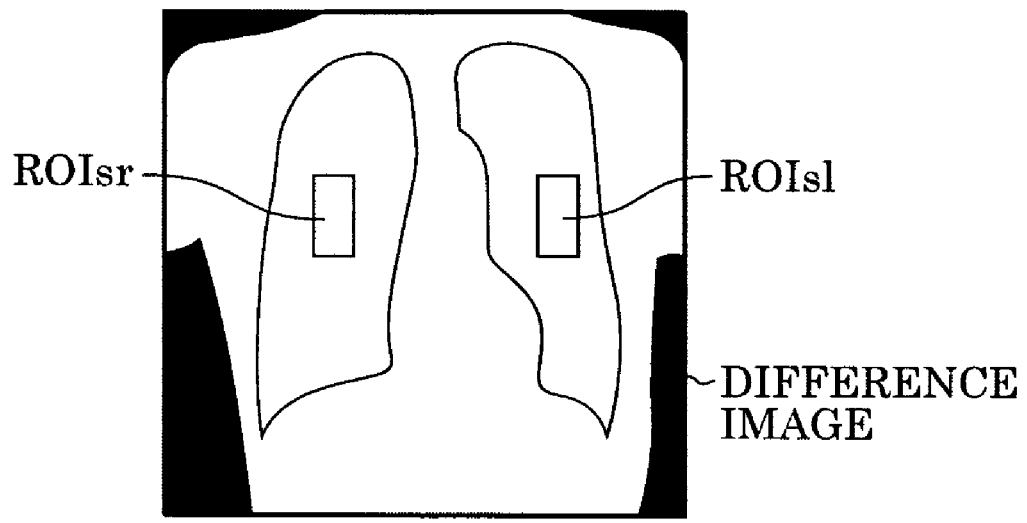
FIGS. 6A and 6B are diagrams showing examples of manners in which sample regions are defined.

That is, in step S16, a sample region is defined in a part corresponding to a lung window in the difference image. In an example shown in FIG. 6A, two sample regions ROIsr and ROIsl are defined in a difference image. These two sample regions are set at the center of a lung window extracted from the past image Ip. The extraction of the lung window can be performed using a known method, and thus a further detail description thereof is not given herein.

Figure 6B:
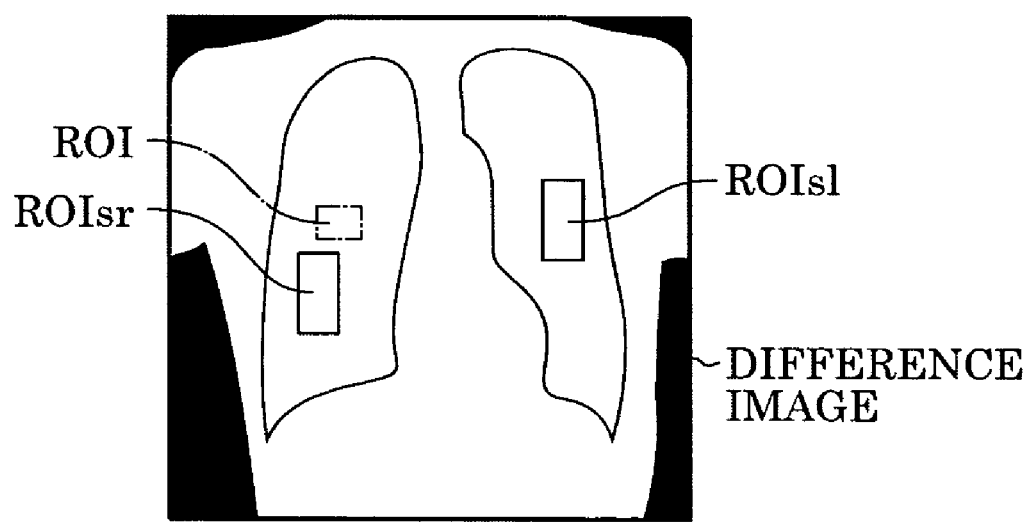

Although two sample regions are defined in the example shown in FIG. 6, the number of sample regions is not limited to 2, but as many sample regions as necessary in diagnosis may be defined in the lung window. Note that in the third embodiment, each sample region is defined at a location such that it overlaps any region of interest defined in diagnosis information supplied from the diagnostic information input unit 7, as shown in FIG. 6B.

In step S17, the distribution of pixel values in each sample region of the difference image is analyzed. If the distribution is greater than a predetermined threshold value, the process proceeds to step S18, but otherwise the difference image is output and the process is ended. The distribution of pixel values may be evaluated based on the width of a histogram of pixel values or the variance of pixel values.

In step S18, shift vectors to be used in the calculation of the fitting coefficients in step S13 are selected, and the process returns to step S13 to calculate the fitting coefficients.

In step S18 described above, shift vectors are selected such that shift vectors associated with points in a sample region whose pixel distribution was determined to be greater than the threshold value are used in the calculation of the fitting coefficients in step S13.

Thus, shift vectors having large errors due to, for example, local distortion of the image caused by a disturbance are removed to prevent the global image alignment from being influenced by such errors, while shift vectors associated with the region of interest are used in the calculation because the region of interest is not included in any sample region.

This makes it possible to produce a difference image as accurate as possible in a region of interest when a local change occurs in the region of interest during a period in which the temporal difference is monitored.

Fourth Embodiment

In the first to third embodiments described above, the difference image is produced based on past diagnosis information. Instead, the manner in which the difference image is displayed may be switched.

In a fourth embodiment, the diagnosis information from the diagnostic information input unit 7 shown in FIG. 1 is supplied to the display controller 5. When the display controller 5 displays the difference image received from the difference processing unit 4 on the display 6, the display controller 5 displays a marker in a superimposed fashion at a location of a region of interest defined in the diagnosis information received from the diagnostic information input unit 7.

When there is no change between images, nothing appears in the difference image produced in the difference determination process. This means that when no change occurs in an existing diseased part, nothing appears in the difference image, which can cause wrong diagnosis. Displaying a region of interest defined in the past diagnosis information in a superimposed fashion makes it possible to prevent such wrong diagnosis.

Fifth Embodiment

In the fourth embodiment described above, a marker indicating a region of interest is superimposed in the difference image. When no region of interest is defined in past diagnosis information, information may be displayed to indicate the fact that no region of interest is defined. That is, when no information associated with a region of interest is supplied from the diagnostic information input unit 7 to the display controller 5, the display controller 5 displays no marker but displays a message or the like on the display 6 to indicate that there is no region of interest defined in past diagnosis. More specifically, for example, in the case in which the window system is used, a subwindow including a message or a symbol is opened to indicate that there is no region of interest defined in past diagnosis.

Sixth Embodiment

In the embodiments described above, associated information Dp of a patient is directly associated with a past image Ip. However, the associated information Dp need not be directly associated with the past image Ip. For example, information Dp associated with a past CT image of the same patient may be used in determination of a region of interest (ROI) in the post image Ip.

A method of determining a region of interest (ROI) on an X-ray image from associated information Dp of a CT image is described below. Recent multi-slice CT techniques can provide an isotropic image. From the isotropic image, an image similar to an X-ray image can be obtained via a RAYSUM process, as is known in the art. The RAYSUM process refers to a process of projecting 3-dimensional volume data of an isotropic image from a point in a space.

In the projection, a ROI marked in the 3-dimensional volume data is also projected, because the mark indicating the ROI is set in each sliced CT image. Thus, the region of interest ROI is set in the RAYSUM image in the exactly same manner as in FIG. 2.

Although in the example described above, associated information of a CT image is used to set a ROI in an X-ray image, associated information Dp of another modality image such as an MRI image or a PET image may be used to set a ROI in an X-ray image in a similar manner. The advantage of using associated information Dp of a CT image in determining a temporal difference between X-ray images is that the exposed dose can be reduced. The CT causes a patient to be exposed to a high dose of radiation, and thus it is not desirable to take a CT image many times. Instead, X-ray images that cause a patient to be exposed to a lower dose of radiation can be taken a plurality of times to monitor a change in a diseased part.

In the first to sixth embodiments described above, the diagnosis information stored together with images in the storage unit 2 may be given in many other ways. One way is to determine a region of interest (ROI) based on a reading report of an image submitted by a doctor. In this case, the position indicating the region of interest is manually written in the reading report and stored together with a particular tag. Another way is to automatically detect a region of interest in an image by analyzing the image using a computer.

The analysis of the image may be performed using CAD capable of automatically detecting a diseased portion from a single image. Alternatively, a diseased portion may be detected by analyzing a difference image produced from a set of images.

The present invention may also be achieved by supplying a storage medium, on which a software program implementing the functions of the system according to any of embodiments described above is stored, to a system whereby a computer (CPU or MPU) in the system reads and executes the program code stored on the storage medium.

In this case, it should be understood that the program code read from the storage medium implements the functions of the embodiments and thus the storage medium storing the program code and the program code fall within the scope of present invention.

Specific examples of storage media which can be employed in the present invention to supply the program code include a ROM, a floppy® disk, a hard disk, an optical disk, a magneto-optical disk, a CD-ROM, a CD-R, a magnetic tape, and a nonvolatile memory card.

Furthermore, the functions according to any of the first to sixth embodiments of the present invention can be implemented not only by executing a program code on a computer, but also by performing a part or all of the process with an operating system (OS) running on the computer in accordance with the program code. Such implementation of the functions also falls within the scope of the invention.

The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

The program implementing the present invention or the program stored on a storage medium includes program codes corresponding to processing steps shown in FIG. 4 or 5.

As described above, the image processing method and the image processing system according to the present invention are capable of properly determining a temporal difference between images.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-046482 filed Feb. 23, 2004, which is hereby incorporated by reference herein.

What is claimed is:

1. An image processing method of performing a temporal difference determination process based on at least diagnosis information associated with first image data or diagnosis information associated with second image data, comprising:
    determining points on the second image data, the points corresponding to respective representative points on the first image data;
    calculating a shift vector indicating the difference between each representative point and a corresponding point;
    calculating modification coefficients by performing two-dimensional fitting on shift vectors weighted by weighting factors, the weighting factors being determined based on region information included in the diagnosis information;
    modifying coordinates of at least one of the first image data and the second image data in accordance with the modification coefficients;
    determining a difference between the first image data and the second image data aligned with each other; and
    displaying a result of the difference determination and the diagnosis information,
    wherein the manner of displaying the result of the difference determination process is switched depending on the diagnosis information.

2. An image processing method according to claim 1, wherein the displaying includes displaying a marker indicating a region of interest determined based on the past diagnosis information in such a manner that the marker is superimposed on the result of the difference determination process.

3. An image processing method of performing a temporal difference determination process based on at least diagnosis information associated with first image data or diagnosis information associated with second image data, comprising:
    determining points on the second image data, the points corresponding to respective representative points on the first image data;
    calculating a shift vector indicating the difference between each representative point and a corresponding point;
    calculating modification coefficients by performing two-dimensional fitting on shift vectors weighted by weighting factors, the weighting factors being determined based on region information included in the diagnosis information;
    modifying coordinates of at least one of the first image data and the second image data in accordance with the modification coefficients; and
    determining a difference between the first image data and the second image data aligned with each other,
    wherein when coordinates of n representative points of the first image data are denoted by (Xi, Yi) (where i=1 to n), the modification coefficients are denoted by Cn, the differences in X coordinate between the respective representative points of the first image data and respective corresponding points of the second image data are denoted by $\Delta xi$, and the weighting factors are denoted by wi, the modification coefficients Cn are determined such that the following equation has a minimum value:

$$Sx = \sum_{i=1}^{n} w_i (\Delta x_i - (c_i x_i^m y_i^m + \Lambda + c_{k-2} y_i + c_{k-1} x_i + 1))^2$$

and wherein the weighting factors wi are modified based on the region information.

4. A computer-readable storage medium including a program stored therein for causing a computer to implement an image processing method of performing a temporal difference determination process based on at least diagnosis information associated with first image data or diagnosis information associated with second image data, the image processing method comprising:

- determining points on the second image data, the points corresponding to respective representative points on the first image data;
- calculating a shift vector indicating the difference between each representative point and a corresponding point;
- calculating modification coefficients by performing two-dimensional fitting on shift vectors weighted by weighting factors, the weighting factors being determined based on region information included in the diagnosis information;
- modifying coordinates of at least one of the first image data and the second image data in accordance with the modification coefficients;
- determining a difference between the first image data and the second image data aligned with each other,
- displaying a result of the difference determination and the diagnosis information,
- wherein the manner of displaying the result of the difference determination process is switched depending on the diagnosis information.

5. An image processing system for performing a temporal difference determination process based on at least diagnosis information associated with first image data or diagnosis information associated with second image data, comprising:

- point determination means for determining points on the second image data, the points corresponding to respective representative points on the first image data;
- calculation means for calculating a shift vector indicating the difference between each representative point and a corresponding point;
- calculation modification means for calculating modification coefficients by performing two-dimensional fitting on shift vectors weighted by weighting factors, the weighting factors being determined based on region information included in the diagnosis information;
- modification means for modifying coordinates of at least one of the first image data and the second image data in accordance with the modification coefficients;
- difference determination means for determining a difference between the first image data and the second image data aligned with each other; and
- display means for displaying a result of the difference determination and the diagnosis information,
- wherein the manner of displaying the result of the difference determination process is switched depending on the diagnosis information.

6. An image processing system according to claim 5, wherein the diagnosis information is selected from the group consisting of a reading report, a result of a temporal difference determination process, and a result of a non-difference CAD process.

7. An image processing method of performing a temporal difference determination process based on at least diagnosis information associated with first image data or diagnosis information associated with second image data, comprising:

- determining points on the second image data, the points corresponding to respective representative points on the first image data;
- calculating a shift vector indicating the difference between each representative point and a corresponding point;
- calculating modification coefficients by performing two-dimensional fitting on shift vectors weighted by weighting factors, the weighting factors being determined based on region information included in the diagnosis information;
- modifying coordinates of at least one of the first image data and the second image data in accordance with the modification coefficients;
- determining a difference between the first image data and the second image data aligned with each other; and
- displaying a result of the difference determination and the diagnosis information,
- wherein, when no region of interest is acquired from the diagnosis information, information indicating that there is no region of interest is displayed.

* * * * *